United States Patent
Dima

(10) Patent No.: US 9,600,872 B2
(45) Date of Patent: Mar. 21, 2017

(54) SYSTEM AND METHOD FOR DETECTING AND DOCUMENTING STRAW QUALITY

(71) Applicant: DEERE & COMPANY, Moline, IL (US)

(72) Inventor: Cristian Dima, St. Ingbert / Rohrbac (DE)

(73) Assignee: DEERE & COMPANY, Moline, IL (US)

( * ) Notice: Subject to any disclaimer, the term of this patent is extended or adjusted under 35 U.S.C. 154(b) by 3 days.

(21) Appl. No.: 14/636,342

(22) Filed: Mar. 3, 2015

(65) Prior Publication Data
US 2015/0262351 A1 Sep. 17, 2015

(30) Foreign Application Priority Data
Mar. 12, 2014 (DE) .................. 10 2014 204 603

(51) Int. Cl.
*G06T 7/00* (2006.01)
*G06T 7/40* (2006.01)
*A01D 41/127* (2006.01)

(52) U.S. Cl.
CPC .......... *G06T 7/0004* (2013.01); *A01D 41/127* (2013.01); *A01D 41/1278* (2013.01); *G06T 7/408* (2013.01); *G06T 2207/10004* (2013.01); *G06T 2207/10024* (2013.01); *G06T 2207/30188* (2013.01)

(58) Field of Classification Search
CPC ......... G06T 7/0004; G06T 2207/30188; G06T 7/408; G06T 2207/10024; G06T 2207/10004; A01D 41/127; A01D 41/1278
See application file for complete search history.

(56) References Cited

U.S. PATENT DOCUMENTS

| | | | |
|---|---|---|---|
| 6,119,442 A * | 9/2000 | Hale | A01D 41/127 56/10.2 H |
| 7,877,969 B2 * | 2/2011 | Behnke | A01D 41/127 56/10.2 R |
| 2005/0102079 A1 * | 5/2005 | Hofer | A01D 41/1278 701/41 |

(Continued)

FOREIGN PATENT DOCUMENTS

| | | |
|---|---|---|
| DE | 10349321 A1 | 5/2005 |
| DE | 10351861 A1 | 6/2005 |

(Continued)

OTHER PUBLICATIONS

European Search Report issued in counterpart application No. 15154985.4, dated Jul. 20, 2015 (7 pages).

(Continued)

*Primary Examiner* — Aaron W Carter
*Assistant Examiner* — Menatoallah Youssef
(74) *Attorney, Agent, or Firm* — Yee & Associates, P.C.

(57) ABSTRACT

A system and a method for detecting and documenting the quality of straw, having the following steps: recording an image of a straw swath with a camera, generating a signal regarding the quality of the straw by means of an image-processing system based on parameters derived from the image of the camera, and storing and/or displaying the signal of the image processing system and/or controlling an actuator based on the signal of the image processing system.

14 Claims, 3 Drawing Sheets

(56) References Cited

U.S. PATENT DOCUMENTS

2008/0224445 A1\* 9/2008 Viaud ................ A01F 15/0883
                                                         280/442

FOREIGN PATENT DOCUMENTS

| DE | 602004011373 T2 | 7/2008 |
| DE | 102007007040 A1 | 8/2008 |
| DE | 102012223434 A1 | 6/2014 |
| EP | 1813146 A2 | 8/2007 |
| EP | 2368419 A1 | 9/2011 |
| JP | 2005137260 A | 6/2005 |
| JP | 2008182938 A | 8/2008 |

OTHER PUBLICATIONS

German Search Report issued in counterpart application No. 10 2014 204 603.3, dated Feb. 25, 2015 (4 pages).
Lenaerts, B. et al; Sensing to Monitor Straw Output Quality of a Combine Harvester. Computers and Electronics in Agriculture 85 (2012), 40-4 [Retrieved on Feb. 20, 2015].

\* cited by examiner

SYSTEM AND METHOD FOR DETECTING AND DOCUMENTING STRAW QUALITY

CROSS-REFERENCE TO RELATED APPLICATIONS

Pursuant to 35 USC §119, this application claims the benefit of and priority to German patent application no. 102014204603.3, filed on Mar. 12, 2014, which is herein incorporated by reference in its entirety.

TECHNICAL FIELD

The invention relates to a system and method for detecting and documenting straw quality.

BACKGROUND

When harvesting grain (wheat, barley, etc.) with a combine, the straw separated from the grain is usually discharged onto the field at the rear end of the combine, either in the form of a swath to be later taken up by a baler for further processing, or in chopped form over the width of the cutting path. If the straw is to be further processed, the extent to which the straw is damaged during the threshing and separating process depends on the design of the combine and the adjustment thereof, in addition to the properties of the grain plants. Thus, an excessively small threshing gap can cause a higher content of broken straw than a larger threshing gap.

In many cases, the quality of the straw plays a large part in the further utilization, because heavily damaged straw is barely suitable for use as an insulating material in structures and for similar tasks. It would therefore be desirable to detect the quality of the straw by using automatic means that operate more objectively than a human assessor.

It was proposed for this purpose to scan the straw swath in front of a tractor by means of a LiDaR sensor, i.e. a laser beam distance meter scanning the swath in the transverse direction, in order to evaluate the average height of the swath and the standard deviation thereof, proceeding from the assumption that damaged straw forms a more compact swath than undamaged straw (B. Lenaerts et al., LiDaR sensing to monitor straw output quality of a combine harvester, Computers and Electronics in Agriculture 83 (2012), 40-44). Accordingly, the straw quality is derived directly from the swath height, which can lead to erroneous assessments in case of locally lower throughputs.

Mounting a rear camera on the combine was also proposed in the prior art, so that by means of a monitor connected to the camera, the operator can check from his working position whether the crop residue is being discharged properly (JP 2005 137 260 A, JP 2008 182 938 A). U.S. Pat. No. 6,119,442 A discloses a camera that is mounted on the straw outlet of an axial separating rotor and is used to detect lost grain in the straw. None of these combines provide monitoring or automatic detection of the straw quality.

SUMMARY

The present invention has the objective of providing an improved system for detecting and documenting the quality of straw, and in particular one that operates more precisely than the prior art, and of providing a corresponding method.

The present invention is defined by the claims.

A system for detecting and documenting the quality of straw comprises: a camera, the field of view of which is directed onto or can be aligned with a straw swath, and which can be operated to record at least one image of the straw swath that contains sufficient detail that individual straw particles can be identified; an image-processing system connected by signal transmission to the camera and that can be operated to generate a signal regarding the quality of the straw from the parameters derived from the image of the camera; and a storage and/or display and/or control unit that is used for storing and/or displaying the signal from the image-processing system and/or for controlling an actuator on the basis of the signal from the image-processing system.

In other words, a system is provided that uses the image data to perform measurements of straw quality. The system comprises a camera for generating image files of the straw swath and an image-processing system having software for deriving the quality of the straw from the image files of the camera. This system can be carried as a hand-held device (e.g. in the form of a smartphone or tablet computer) by a user over a field in order to assess the straw swath, or it can be mounted on a baler or a tractor towing the baler in order to associate the determined straw quality with the bale being produced, for which one can use a data carrier mounted on the bale and/or a map generated while working that includes the position and the quality of the bale. It would also be conceivable to mount the system directly on the combine, preferably in an environment protected from dust, or for the operator of the combine or another person to record an image of the straw swath from time to time while harvesting and transmit it to a control unit of the combine, so that this unit can improve the adjustment of the combine (particularly the speed of the threshing drum or the rotor and/or the threshing gap). In this respect, the reader is referred to the procedure according to DE 10 2012 223 434 A1, as well as B. Lenaerts et al. (cited above), the disclosures of which are incorporated in the present documents by reference. This data acquisition can also be accomplished by the above-mentioned tractor towing the baler.

The information provided by the system can be used to determine the value of straw, i.e. the sale price. It can also be used to evaluate settings of the combine that produced the straw swath, and if necessary, to modify the straw quality even during the ongoing harvesting process in order to improve the straw quality (alongside other operating parameters such as throughput, grain quality and grain losses).

In an advantageous embodiment, the image-processing system identifies straw particles contained in the image of the camera, evaluates one or more properties of the identified straw particles, and based on the evaluated property or properties of the identified straw particles, generates the signal regarding the quality of the straw.

The property evaluated by the image-processing system can be the length of the straw particles and/or the number of bends of the straw particles and/or fraying and/or the color of the straw particles and/or color differences among the straw particles and/or a deviation from a normal shape of the straw particles. Because each image contains multiple straw particles, statistical information, e.g. histograms or average values and standard deviations, can be derived from the properties mentioned above.

The straw particles in the image can be identified by the image-processing system, particularly based on edges and/or local properties of the image such as color and/or texture, wherein overlaps of straw particles by other straw particles and/or chaff are preferably taken into consideration.

In another embodiment, the image-processing system determines a signal regarding straw quality based on an evaluated statistical distribution of the frequency content in the image and/or the length of at least approximately straight edges in the image and/or based on the proportion of low-texture zones in the image.

The image-processing system can be expediently provided with information regarding the imaging conditions of the camera, particularly in the form of data regarding the focal length and/or the image angle and the distance of the straw swath from the camera and/or based on a reference feature contained in the image.

The image-processing system can be connected to an interface, by means of which an operator can input an estimate of the straw quality and store the input estimate together with the signal generated by the image-processing system regarding the straw quality, or can adjust the evaluated straw quality to the estimate based on the input estimate.

The image-processing system is preferably connected to a position-determination device and stores the signal regarding the straw quality in a georeferenced form.

The camera and the image-processing system are mounted in particular on a vehicle, e.g. a tractor. The image-processing system can identify the position of the swath in the image based on the image and supply the position to a steering system.

BRIEF DESCRIPTION OF THE DRAWINGS

The detailed description of the drawings refers to the accompanying figures in which.

DETAILED DESCRIPTION OF THE DRAWINGS

Figure 1:
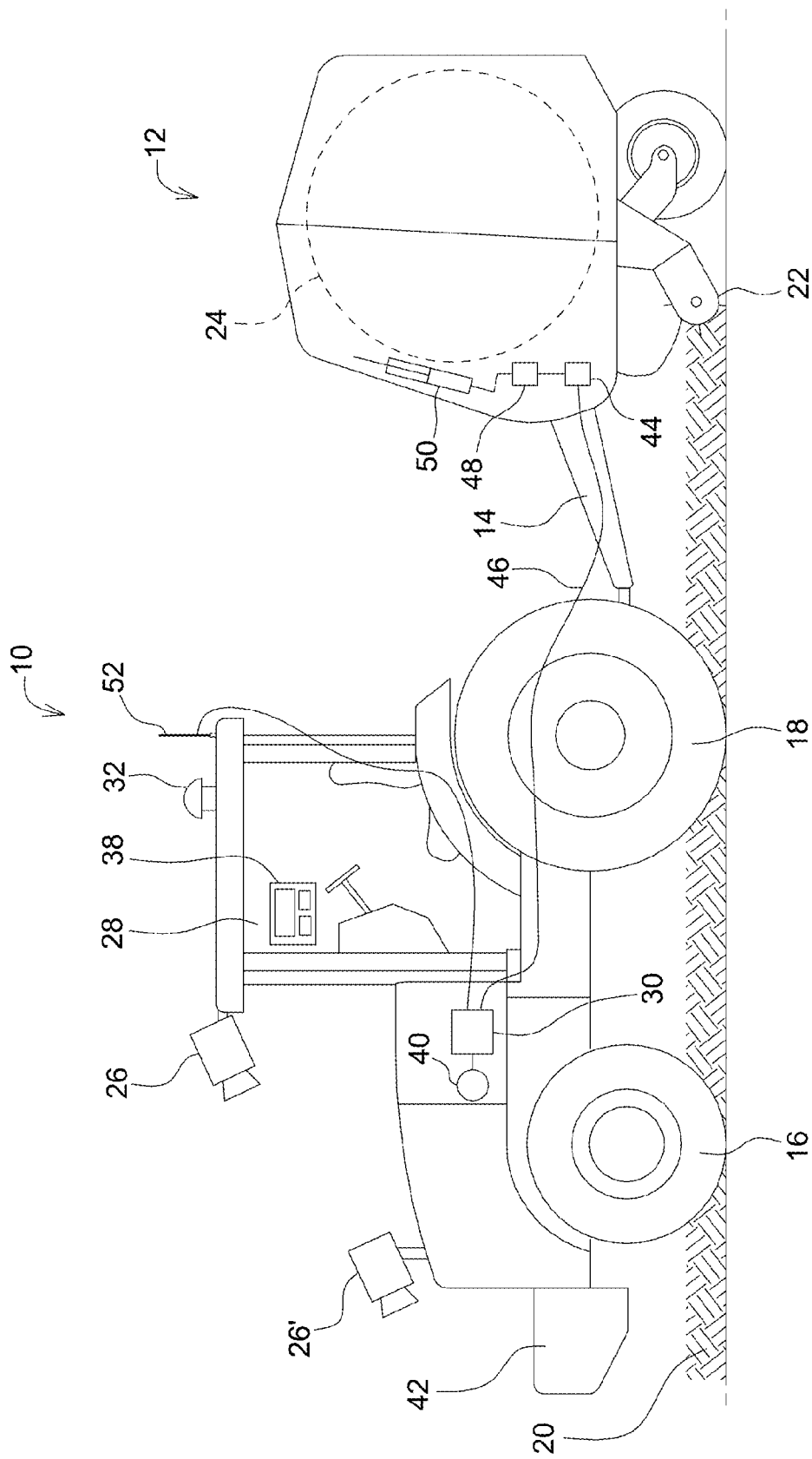
FIG. 1 shows a side view of a tractor along with a baling press and a system for determining the straw quality.

FIG. 1 shows a combination of a tractor 10 and a baler 12 coupled thereto by means of a tongue 14. The tractor 10 has front-end steerable wheels 16 and rear driven wheels 18. It tows the baler 12, which takes up the crop from a straw swath 20 by means of a pick-up 22 and shapes it into bales 24. Instead of the illustrated round baler, the baler 12 can also be a rectangular baler. It could also have a self-propelled design.

A camera 26 is mounted on the upper side, in the direction of travel, of the driver's cab 28 in the tractor 10. It is located at the longitudinal center plane of the tractor 10 and its objective is directed forward and downward onto the swath 20. A different possible attachment of the camera 26' would be on the front side of the engine hood of the tractor 10 or on a front counterweight 42. The camera 26 or 26' can be mounted on the longitudinal center plane of the tractor 10 or offset therefrom.

Figure 2:
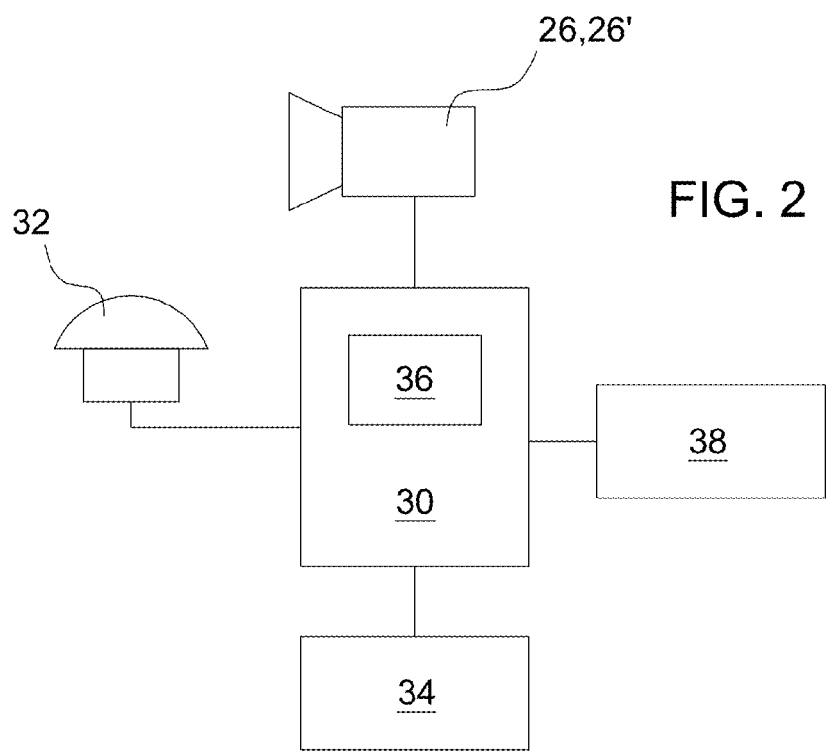
FIG. 2 shows a schematic representation of the system for determining the straw quality.

FIG. 2 schematically shows a system with which the straw quality of the straw swath 20 can be automatically evaluated. The camera 26 or 26' is connected by signal data transmission to an electronic processing unit 30 that contains an image-processing system 36. The processing unit 30 can be additionally connected to a position-determination device 32 in the form of an antenna for receiving signals from a satellite-assisted position determination system (e.g. GPS, Glonass or Galileo), a user interface 38 and a storage device 34. The processing unit 30 can be additionally connected via a vehicle bus 46 to a control unit 44 of the baler 12 and then activate, via a valve unit 48, an actuator 50 for adjusting the pressure of the pressing means of the baler 12. The processing unit 30 can also be connected to a communication unit 52 to transmit data to a remote location, e.g. a combine (not shown) that drives in front of the baler 12 over the field and harvests crop.

Figure 3:
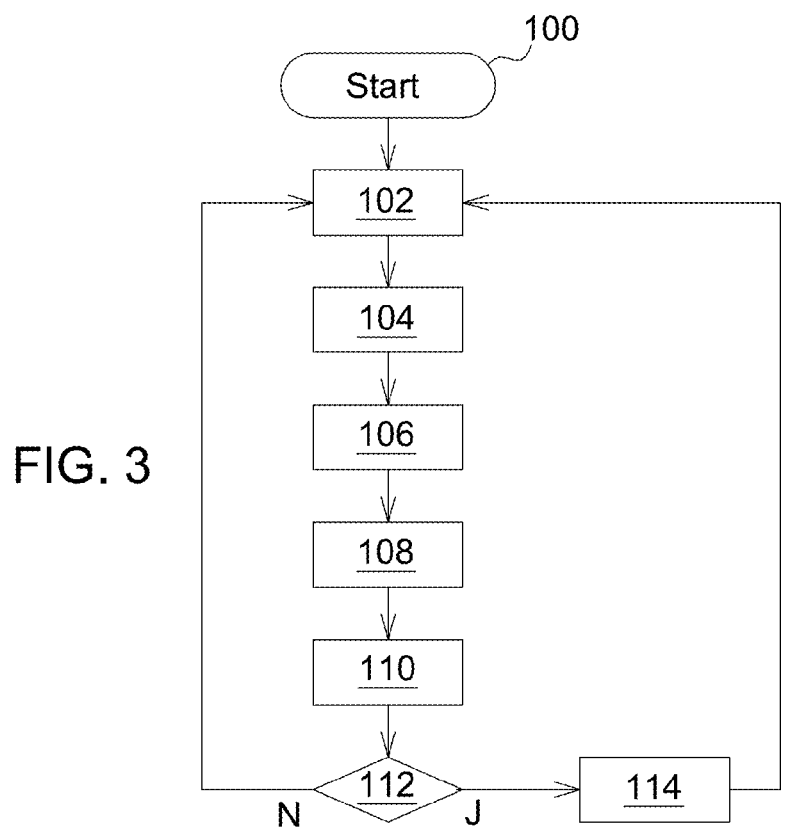
FIG. 3 shows a flowchart according to which the system for determining straw quality operates.

One possible operation mode of the system can be seen in FIG. 3, which shows a flowchart according to which the system can operate. After the start in step 100, an image of the swath 20 is recorded in step 102 during ongoing straw harvesting, the image being sufficiently sharp and detailed to be able to detect individual straw particles. The image is then segmented by the image-processing system 36 in step 104, in order to identify individual straw particles. Prior pre-processing can be performed, e.g. to increase the edge contrast.

Figure 4:
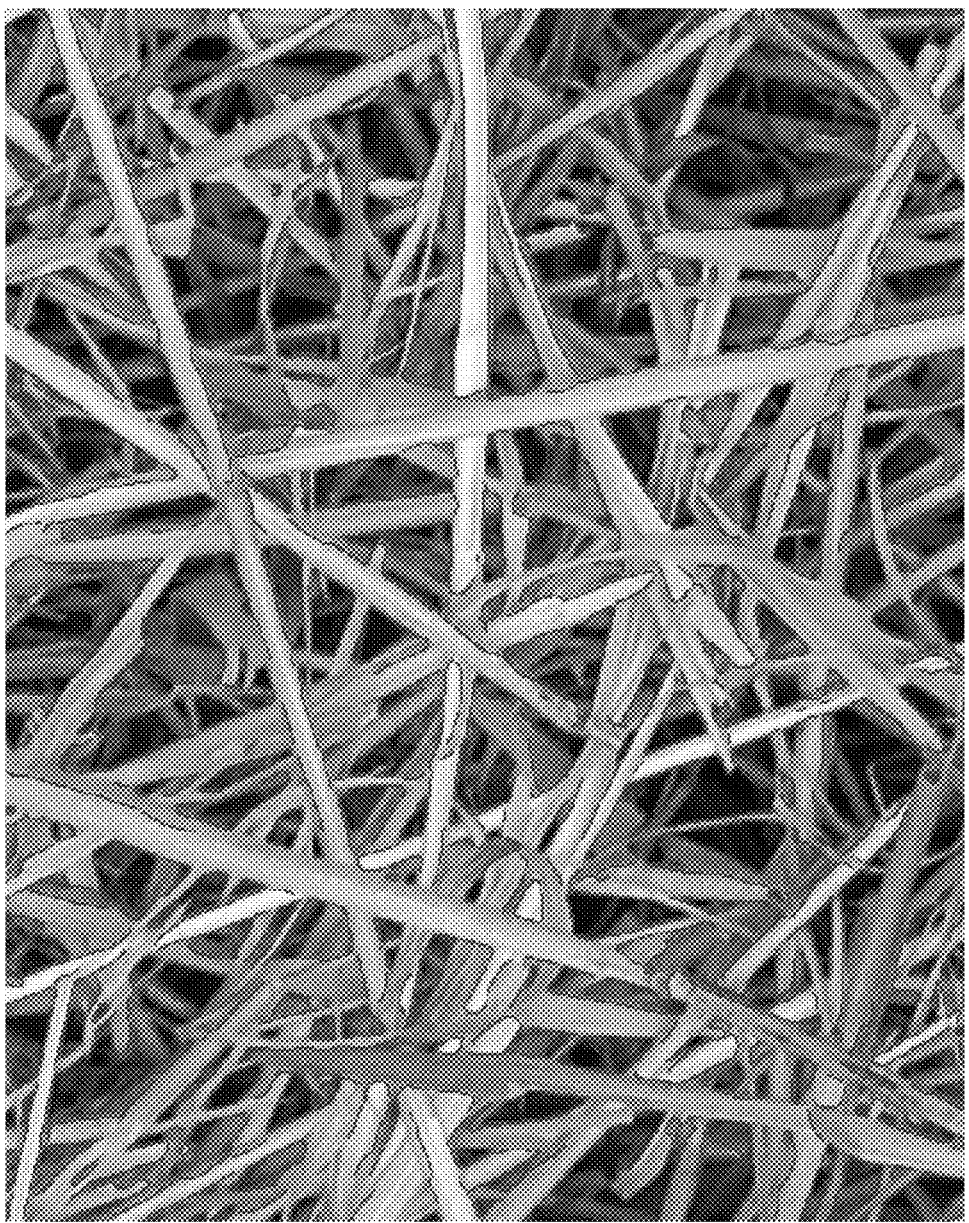
FIG. 4 shows a typical image of a portion of a straw swath taken by the system for determining the straw quality, wherein the edges identified in the image are marked.

For this purpose, edges, i.e. contiguous pixels located at positions at which the brightness and/or color of the image changes relatively abruptly, can be identified in the image. The reader is referred in this respect to FIG. 4, which shows a cutout of a typical image from the camera 26 or 26', in which identified edges of straw particles are emphasized in a dark color. Alternatively or additionally, local properties of the image such as color and/or texture are identified. In this manner, pixels having a defined color (yellowish to brown) can be associated with the straw, while pixels of a different color are considered to be background. The texture in the image can also be used for distinguishing between straw and background, because the straw particles are relatively elongated and generally furnished with longitudinally running features (grooves or the like), whereas the background and other particles have different textures. In this regard, the reader is referred to DE 103 51 861 A1, the disclosure of which is hereby incorporated by reference into the present documents. In this segmentation, overlaps of straw particles by other straw articles and/or chaff (easily recognizable in FIG. 4) are preferably taken into account, more particularly by ignoring covered regions or assigning them to two adjacent straw particles.

Thus the straw particles in the image, i.e. the position of image elements assignable to straw particles, have been identified at the end of step 104. Then a step 106 follows, in which the image-processing system 36 evaluates properties of the identified straw particles that are relevant to straw quality. For example, such properties can be the length of the straw particles and/or fraying of the straw particles and/or the number of bends in the straw particles and/or the color of the straw particles and/or color differences among the straw particles and/or a deviation from a normal shape of the straw particles. The length of the straw particles corresponds to their longest dimension. Bends are recognized by angles exceeding a threshold value in the edges of the straw particles. Like fraying, the color or local color differences of the straw particles can indicate breaks, and identified straw particles that deviate from a normal (elongated rectangular) shape generally likewise indicate straw breakage. In this step, one or more of the aforementioned properties can be directly determined, or information derived therefrom such as histograms or mean values and standard deviations, or data derived from multiple properties can be determined.

Chaff or other particles, particularly lost grain, can also be identified in step 104. This information can be used for evaluating the operating quality of the combine.

The properties evaluated in step 106 are then combined for the entire image in the subsequent step 108 in order to determine a signal regarding the quality of the straw (i.e. a quality parameter). Any desired statistical methods can be used for this purpose, such as determining a mean value and a standard deviation (and/or other functions or descriptive statistics) of one or more properties of the straw particles. The different properties can enter into the signal regarding the quality of the straw with different weightings. Thus a signal regarding the quality of the straw is available at the end of step 108. Said signal can indicate, for example, the average length (and standard deviation thereof, if applicable) of the straw particles, or any desired measurement derived from a number of other properties evaluated in step 106, which measurement can follow a grading scale (1 through 6 or the like), or the signal can indicate the financial value of straw.

The derivation of said signal from the property or properties can be fixedly predetermined or can be based completely or partially on inputs by the operator into the interface 38. For example, the operator can indicate whether it is the straw length or some other property that is particularly important and/or specify the relation between the property and the signal in order, for example, to take into account the expected straw length dependent on the type of grain and the properties of the field. This can take into account the fact that different purposes for using the straw demand different properties and also that different farmers have different ideas regarding the evaluation of the straw. This input need not be done during work, but can instead be accomplished during installation or initial operation of the system, whether via the interface 38 or via a different interface such as a smartphone or office computer and remote data transmission. As mentioned below, said signal can be derived automatically by the system from the property or properties.

In order to determine the actual length of the straw particles in step 106 and/or 108, the image-processing system 36 requires information regarding the imaging conditions of the camera 26 or 26', i.e. data regarding the absolute length of the individual image elements. This information can be fed to the image-processing system 36 in the form of data regarding the focal length and/or image angle of the object lens of the camera 26 or 26' and the distance of the straw swath 20' from the camera 26 or 26'. Alternatively or additionally, the image-processing system 36 can evaluate the imaging conditions on the basis of a reference feature contained in the image, e.g. a front counterweight 42 recorded in the image by the camera 26', or the engine hood also recorded by the camera 26.

Step 110 follows, in which the signal regarding the quality of the straw is stored in the storage device 34 and/or displayed on a display unit of the interface 38. This is followed by step 112, in which there is a query as to whether a bale 24 was just finished or is nearly finished. If that is not the case, step 102 again follows, i.e. the process is passed through all over again and a new image of the straw swath 20 is recorded and evaluated. Otherwise, step 114 follows, in which an averaged signal regarding the quality of straw for the bale (i.e. the signals regarding the quality of straw that are to be associated with the images recorded and evaluated during production of the respective bale 24 are taken into account) is stored along with the respective position in the storage device 34. This data can also be stored on a transponder chip that is mounted on or in the respective bale. The individual bales are therefore uniquely associated with their straw quality. Then step 102 again follows.

In step 114, the operator can input, via the interface 38, an evaluation of the straw quality, which is stored for the respective bale 24 in the memory device 34. The image-processing device 36 can also determine a relationship between the evaluation by the operator and the associated signal with respect to the quality of the straw, whether in order to enable a learning ability for the image-processing system 36 (by recognizing the relationship between the signal and the user input and using it for evaluation of later signals adapted to the user input) or in order to be able to determine possible errors of the image-processing system 36. This can also take into account the fact that different purposes for using the straw demand different properties and also that different farmers have different ideas regarding the evaluation of the straw. This evaluation can also be input in advance, e.g. during inspection of the field, and via any other desired interface, and can be transmitted to the image-processing device.

The signals regarding the quality of the straw can be transmitted by the processing unit 30 via the vehicle bus 46 to the control unit 44 of the baler 12, which for example controls the pressing force of the baler 12 via the valve unit 48 and the actuator 50 based on the length of the straw, in order to press short straw with less pressure than long straw. The signals regarding the quality of the straw can also be transmitted via the communication unit 52 to a combine, which can modify its threshing settings during the harvesting, independently or by input from the driver, in order to improve the straw quality.

It should be noted that the process used by the image-processing system can be somewhat simplified in another embodiment by evaluating the signal with respect to the quality of the straw by evaluating a statistical distribution of the frequency content in the image. In other words, a Fourier transform of the image is examined for high-frequency components. The proportion of high-frequency components indicates a number of individual details in the image, which in turn indicates a high content of broken straw. Alternatively or additionally, the signal can be evaluated on the basis of the length of at least approximately straight edges in the image and/or on the basis of the content of low-texture zones in the image. The length of the straight edges, which can generally be attributed to straw particles, indicates the length of the straw particles. The proportion of low-texture zones can likewise be attributed to straw particles. Accordingly, these relatively simple and quickly evaluated variables also form a measure of the straw quality.

There is also the possibility of using the signals of the camera 26 or 26' for generating a steering signal for a steering system 40 of the tractor 10, by identifying the position of the swath and using it to generate the steering signal. In this regard, the reader is again referred to the disclosure of DE 103 51 861 A1.

Steps of FIG. 3
100 Start
102 Record image of the swath
104 Segment the image, identify straw particles
106 Evaluate one or more properties of identified straw particles
108 Determine the signal relating to the quality of the straw for the image
110 Display and/or store the signal regarding the quality of the straw for the image
112 Bale finished?
114 Store average signal for the bale along with the position

What is claimed is:

1. A system for detecting and documenting quality of straw, comprising:
   a camera, a field of view of which is directed onto or is aligned with a straw swath, the camera configured to record at least one image of the straw swath;
   an image-processing system connected by signal transmission to the camera and that is configured to generate a signal regarding the quality of the straw from parameters derived from the image recorded by the camera; and
   a control unit configured to control an actuator based on the signal from the image-processing system;
   wherein the image-processing system is connected to an interface for an operator to input an estimate of the quality of the straw, wherein the interface is configured to: store the input estimate together with the signal generated by the image-processing system regarding the straw quality, or adjust the generated straw quality to the estimate based on the estimate.

2. The system according to claim 1, wherein the image processing system is configured to generate the signal regarding the quality of the straw by:
   identifying straw particles contained in the image recorded by the camera;
   evaluating one or more properties of the identified straw particles; and
   generating the signal regarding the quality of the straw based on the properties of the identified straw particles.

3. The system according to claim 2, wherein the one or more properties evaluated by the image-processing system comprises at least one of:
   a length of the straw particles;
   a number of bends of the straw particles;
   fraying of the straw particles;
   color of the straw particles;
   color differences among the straw particles; or
   a deviation from a normal shape of the straw particles.

4. The system according to claim 2, wherein the image processing system is configured to identify straw particles in the image based on at least one of: edges or local properties of the image, wherein the identification of straw particles is further based on overlapping of straw particles with other straw particles or overlapping of straw particles with chaff.

5. The system according to claim 2, wherein the image-processing system is configured to evaluate the signal regarding the quality of the straw based on at least one of:
   an evaluated statistical distributional of a frequency content in the image;
   a length of at least approximately straight edges in the image; or
   a proportion of low-texture zones in the image.

6. The system according to claim 1, wherein the image-processing system is provided with information regarding imaging conditions of the camera, the imaging conditions selected from the group consisting of: data regarding an angle of the image; data regarding a focal length of the camera; distance of the straw swath from the camera; and a non-crop based reference feature in the image.

7. The system according to claim 1, wherein the image-processing system is connected to a position-determination device and is configured to store the signal regarding the straw quality in a georeferenced form.

8. The system according to claim 1, wherein the camera and the image-processing system are mountable on a vehicle, and the image-processing system is configured to identify the position of the swath in the image and to supply the position to a steering system of the vehicle.

9. A method for detecting and documenting the quality of straw, the method comprising:
   recording an image of a straw swath with a camera;
   generating a signal regarding the quality of the straw by an image-processing system based on parameters derived from the image recorded by the camera;
   inputting an estimate of the quality of the straw by an operator through an interface connected to the image processing system;
   through the interface, storing the input estimate together with the signal generated by the image-processing system regarding the straw quality or adjusting the generated straw quality to the estimate based on the estimate; and
   controlling an actuator based on the signal from the image processing system.

10. The system according to claim 1, further comprising:
    a baler, wherein the signal regarding the quality of the straw represents the quality of the straw for a particular bale of straw bailed by the baler.

11. The system according to claim 2, wherein at least one of the one or more properties of the identified particles is a property pertaining to an individual straw particle of the identified straw particles.

12. The system according to claim 11, wherein properties for a plurality of individual straw particles are combined when generating the signal regarding the quality of the straw.

13. The system according to claim 2, wherein the one or more properties of the identified straw particles are a physical size or shape of the identified straw particles.

14. The system according to claim 3, wherein the image-processing system is connected to an interface for an operator to input a deviation from the normal shape of the straw particles, and wherein the image-processing system is further configured to take into account the deviation when evaluating the one or more properties of the identified straw particles.

* * * * *